United States Patent
Lee et al.

(10) Patent No.: US 7,293,183 B2
(45) Date of Patent: Nov. 6, 2007

(54) SYSTEM FOR STORING WORKING CONTEXT IN A NON-VOLATILE MEMORY WHILE IN A POWER-OFF SUSPEND MODE AND RESTORING THE WORKING CONTEXT WHEN THE POWER-OFF SUSPEND MODE IS RELEASED

(75) Inventors: Jin-aeon Lee, Suwon (KR); Yun-tae Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 428 days.

(21) Appl. No.: 10/647,990

(22) Filed: Aug. 26, 2003

(65) Prior Publication Data

US 2004/0044917 A1 Mar. 4, 2004

(30) Foreign Application Priority Data

Aug. 28, 2002 (KR) ...................... 10-2002-0051195

(51) Int. Cl.
    G06F 1/32 (2006.01)
(52) U.S. Cl. .................... 713/320; 713/300; 712/228
(58) Field of Classification Search ................ 713/300, 713/320; 712/228
    See application file for complete search history.

(56) References Cited

U.S. PATENT DOCUMENTS 6,131,166 A * 10/2000 Wong-Insley ............... 713/300
6,157,979 A   12/2000 Barnett
6,363,501 B1 * 3/2002 Tobias et al. ................. 714/30
6,738,675 B2 * 5/2004 Dai .............................. 700/22
6,763,415 B1 * 7/2004 Tischler ..................... 710/240

FOREIGN PATENT DOCUMENTS

JP   8147259      6/1996
KR   10-0212196   7/1994

* cited by examiner

Primary Examiner—Chun Cao
Assistant Examiner—Mark Connolly
(74) Attorney, Agent, or Firm—F. Chau & Associates, LLc

(57) ABSTRACT

Provided are an apparatus and method of transmitting working context, which can minimize power consumption in a power-off standby mode of a portable apparatus including a system on a chip, where the method includes selecting a power-off standby mode, transmitting working context with respect to a hardware module, which is mounted on a semiconductor chip, to a predetermined memory, and storing the working context in the predetermined memory, transmitting the working context stored in the memory to a non-volatile memory outside the semiconductor chip, and storing the working context in the non-volatile memory, and executing the power-off standby mode; where the method may further include releasing the power-off standby mode, restoring the working context with respect to the hardware module, which is stored in the non-volatile memory, to the predetermined memory, and recovering the at least one hardware module to a state existing immediately before the power-off standby mode was executed by using the working context restored to the memory from the non-volatile memory.

13 Claims, 5 Drawing Sheets

SYSTEM FOR STORING WORKING CONTEXT IN A NON-VOLATILE MEMORY WHILE IN A POWER-OFF SUSPEND MODE AND RESTORING THE WORKING CONTEXT WHEN THE POWER-OFF SUSPEND MODE IS RELEASED

CROSS-REFERENCE TO RELATED APPLICATION

This application claims foreign priority to Korean Patent Application No. 2002-51195, filed on Aug. 28, 2002, in the Korean Intellectual Property Office.

BACKGROUND OF THE INVENTION

1. Field of the Invention

The present invention relates to an apparatus and method for storing and restoring data, and more particularly, to an apparatus and method in which at least one hardware module rapidly reaches a state by using a working context stored in a non-volatile memory.

2. Description of the Related Art

Portable apparatuses such as mobile phones can be used for more time if they have low power consumption. Thus, portable apparatuses in a system-on-a chip ("SOC") design use a standby mode to reduce power consumption. SOC means that a plurality of systems having independent functions are mounted on one semiconductor chip.

The most common method of reducing power consumption in a standby mode is to cut off a clock signal supplied to all or several circuits of a SOC and reduce the amount of dynamic current consumed by all or several circuits of the SOC. In this case, all or several circuits of the SOC from which the clock signal is cut off do not lose any working context.

However, deep submicron semiconductor devices have currently been designed in the form of a SOC. Since an operating threshold voltage of the SOC decreases, a static leakage current generated in the SOC increases. Thus, the dynamic current consumption and the static leakage current are common problems in portable apparatuses.

Hence, some SOCs use a power-off standby mode, during which power supplied to all or several circuits of the SOCs, which are not needed to be used for a long period of time, is cut off to remove static leakage current generated in the SOCs.

Unfortunately, when the power supplied to the SOCs is cut off, the working context of all or several circuits of the SOCs is lost. When power is supplied again to the all or several circuits of the SOCs, the all or several circuits of the SOCs boot up again. In this case, a long time is required to boot up the circuits, and the all or several circuits of the SOCs do not recover to a state just before the power was cut off.

SUMMARY OF THE INVENTION

The present invention provides an apparatus and method that can minimize power consumption during a power-off standby mode of a portable apparatus in a system-on-a chip ("SOC") design.

The present invention provides an apparatus and method by which working contexts of circuits within an SOC to which the power supply is cut off can be rapidly stored in a low power non-volatile memory to enable rapid recovery to a state just before the power supply was cut off.

According to an aspect of the present invention, there is provided a method of transmitting working context comprising selecting a power-off standby mode; transmitting working context with respect to at least one hardware module to a predetermined memory, the hardware module being mounted on a semiconductor chip, and storing the working context in the predetermined memory; transmitting the working context stored in the memory to a non-volatile memory outside the semiconductor chip; and executing the power-off standby mode.

The method may further comprise releasing the power-off standby mode; restoring the working context with respect to the at least one hardware module in the predetermined memory, the working context being stored in the non-volatile memory; and recovering the at least one hardware module to a state immediately before the power-off standby mode was executed by using the working context restored in the memory from the non-volatile memory.

The non-volatile memory may be a NAND flash memory or a NOR flash memory. The predetermined memory may be inside or outside the semiconductor chip.

The method may further comprise cutting off power supplied to the hardware module having the working context stored in the memory when the power-off standby mode is executed.

The method may further comprise supplying power again to the at least one hardware module, to which the power supply was cut off during the power-off standby mode, when the power-off standby mode is released.

According to another aspect of the present invention, there is provided an integrated circuit comprising at least one hardware module; a memory for storing working context with respect to the at least one hardware module; a microprocessor for transmitting the working context with respect to the at least one hardware module and its own working context to the memory when a power-off standby mode is executed; and a working context transmitting controller for transmitting the working context with respect to the at least one hardware module, which is stored in the memory, to a non-volatile memory outside the integrated circuit, in response to a predetermined command signal.

The working context transmitting controller may include a direct memory access for inputting/outputting the working context between the memory and the non-volatile memory; a control register including a plurality of registers, each of which has corresponding area information on the memory and/or the non-volatile memory; an interface between the direct memory access and the non-volatile memory; and a controller for transmitting the working context from the memory to the non-volatile memory through the interface during the power-off standby mode, and transmitting the working context stored in the non-volatile memory to the memory through the interface when the power-off standby mode is terminated.

The predetermined command signal may be output from the microprocessor or the at least one hardware module.

The working context transmitting controller may restore the working context with respect to the at least one hardware module, which is stored in the non-volatile memory, and the working context with respect to the microprocessor to the memory, when the power-off standby mode is released.

The microprocessor may recover a state of the at least one hardware module and a state of the microprocessor to a state immediately before the power-off standby mode was executed by using the working context with respect to the at least one hardware module and the working context with respect to the microprocessor, which are restored in the memory.

According to still another aspect of the present invention, there is provided an integrated circuit comprising: at least one hardware module; a microprocessor for transmitting working context with respect to the at least one hardware module and its own working context to a memory outside the integrated circuit in a power-off standby mode; and a working context transmitting controller for transmitting the working context with respect to the at least one hardware module from the memory to a non-volatile memory outside the integrated circuit, in response to a predetermined command signal.

According to yet another aspect of the present invention, there is provided a method of transmitting working context, comprising: storing working context with respect to a plurality of hardware modules mounted on a semiconductor chip, in a predetermined memory during a power-off standby mode; and transmitting the working context stored in the memory during the power-off standby mode to a non-volatile memory outside the semiconductor chip.

The method may further comprise: restoring the working context stored in the non-volatile memory and corresponding to the plurality of hardware modules, in the predetermined memory, when the power-off standby mode is released; and respectively restoring the plurality of hardware modules to a state immediately before the power-off standby mode was executed by using the working context restored to the memory.

The memory may be inside or outside the semiconductor chip.

According to another aspect of the present invention, there is provided an integrated circuit comprising: a plurality of hardware modules; a memory for storing working context with respect to the plurality of hardware modules; and a working context transmitting controller for transmitting the working context stored in the memory to a non-volatile memory outside the integrated circuit during a first operating mode, and transmitting the working context with respect to the hardware modules, which is stored in the non-volatile memory, to the memory during a second operating mode, wherein the hardware modules are recovered to a state immediately before the first operating mode was executed by using the working context, which is transmitted from the non-volatile memory to the memory during the second operating mode.

The integrated circuit may further comprise a power controller for controlling power respectively supplied to the plurality of hardware modules to be turned on or off according to the first operating mode or the second operating mode.

The first operating mode may be a mode of cutting off power supplied to at least one hardware module, which is operating among the plurality of hardware modules, and the second operating mode may be a mode of supplying power again to the at least one hardware module, to which power supply is cut off during the first operating mode.

According to further another aspect of the present invention, there is provided an integrated circuit comprising: a plurality of hardware modules; and a working context transmitting controller for transmitting working context with respect to the plurality of hardware modules from a memory outside the integrated circuit to a non-volatile memory outside the integrated circuit, during a first operating mode, and transmitting the working context with respect to the plurality of hardware modules stored in the non-volatile memory to the memory during a second operating mode, wherein the plurality of modules are recovered to a state immediately before the first operating mode was executed by using the working context transmitted from the non-volatile memory to the memory during the second operating mode.

When at least one hardware module among the plurality of hardware modules controls the operation of the remaining hardware modules, each of the remaining hardware modules may be recovered to a state immediately before the first operating mode was executed by using the working context transmitted from the non-volatile memory to the memory by the control of the at least one hardware module during the second operating mode.

The integrated circuit may further comprise a power controller for controlling power supplied to the hardware modules to be turned on or off according to the first operating mode or the second operating mode.

According to another aspect of the present invention, there is provided a system comprising: an integrated circuit having at least one hardware module; and a non-volatile memory outside the integrated circuit, wherein the integrated circuit includes: a memory for storing working context with respect to the at least one hardware module; and a working context transmitting controller for transmitting the working context stored in the memory to the non-volatile memory during a power-off standby mode, and transmitting the working context with respect to the at least one hardware module, the working context being stored in the non-volatile memory, to the memory when the power-off standby mode is released, wherein when the power-off standby mode is released, the at least one hardware module is recovered to a state immediately before the power-off standby mode was executed by using the working context, which is transmitted to the memory.

According to another aspect of the present invention, there is provided a system comprising: an integrated circuit including at least one hardware module; a memory outside the integrated circuit for storing working context with respect to the hardware module; and a non-volatile memory outside the integrated circuit, wherein the integrated circuit includes a working context transmitting controller for transmitting the working context stored in the memory to the non-volatile memory during a power-off standby mode, and transmitting the working context with respect to the at least one hardware module, which is stored in the non-volatile memory, to the memory when the power-off standby mode is released, wherein the at least one hardware module is recovered to a state immediately before the power-off standby mode was executed by using the working context transmitted from the non-volatile memory to the memory, when the power-off standby mode is released.

The working context transmitting controller may include: a direct memory access between the memory and the non-volatile memory for inputting/outputting the working context; a control register including a plurality of registers, each of which has corresponding area information on the memory and/or the non-volatile memory; an interface between the direct memory access and the non-volatile memory; and a controller for controlling the working context to be transmitted from the memory to the non-volatile memory through the interface during the power-off standby mode, and controlling the working context stored in the non-volatile memory to be transmitted to the memory through the interface when the power-off standby mode is released. The at least one hardware module may be a microprocessor.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF PREFERRED EMBODIMENTS

Figure 1:
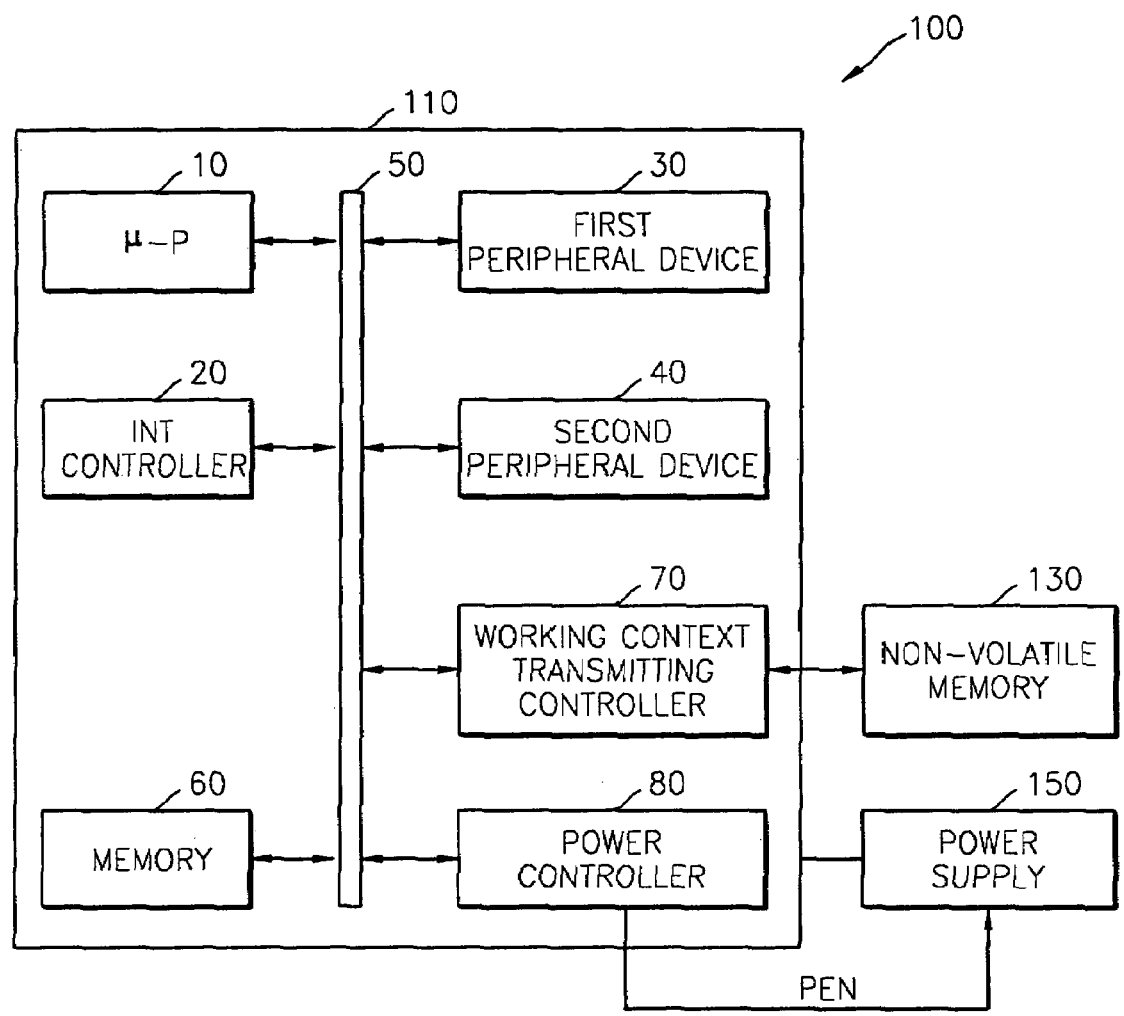
FIG. 1 is a block diagram of a system including a system-on-a chip ("SOC"), according to a first preferred embodiment of the present invention.

The present invention will now be described more fully with reference to the accompanying drawings, in which preferred embodiments of the invention are shown. The same elements are indicated by the same reference numerals.

FIG. 1 is a block diagram of a system including a system-on-a chip ("SOC") according to a first preferred embodiment of the present invention. Referring to FIG. 1, the system 100 includes a SOC 110, a non-volatile memory 130 coupled in signal communication with the SOC 110, and a power supply 150 so coupled with the SOC 110.

The non-volatile memory 130 may include various kinds of non-volatile memories as known in the art, such as a NAND flash memory and/or a NOR flash memory, for examples. It is preferable that the size of the non-volatile memory 130 corresponds to a multiple of the size of a working context.

The power supply 150 supplies a predetermined operating power to the SOC 110. The power supply 150 may be outside the SOC 110 or may be implemented as an on-chip regulator inside the SOC 110.

The SOC 110 includes a microprocessor 10, an on-chip bus 50 coupled in signal communication with the microprocessor 10, an interrupt ("INT") controller 20 coupled in signal communication with the bus 50, a first peripheral device 30 so coupled with the bus 50, a second peripheral device 40 so coupled with the bus 50, a memory 60 so coupled with the bus 50, a working context transmitting controller 70 so coupled with the bus 50, and a power controller 80 so coupled with the bus 50.

While FIG. 1 shows only the two peripheral devices 30 and 40 for convenience of explanation, the SOC 110 may include more peripheral devices. Here, the peripheral devices 30 and 40 represent hardware modules, which operate in response to a corresponding working context. The term of hardware module may include the microprocessor 10.

Steps of cutting off power supplied to all or several circuits or modules of the SOC 110 and entering a standby mode (referred to as a power-off standby mode hereinafter) will be explained below.

To be more specific, when a power-off standby mode is selected by a predetermined power management program, which may be resident in an operating system ("OS") of the SOC 110, the SOC 110 performs the following series of steps for executing the power-off standby mode.

After a predetermined standby time set by a user has passed or a user selects a power-off standby mode, the SOC 110 prepares for the power-off standby mode to reduce a static leakage current of the SOC 110.

In this case, the INT controller 20 receives an interrupt signal output from a predetermined hardware module, and transmits the interrupt signal to the microprocessor 10. For example, the INT controller 20 receives an interrupt signal inputted through a first peripheral device 30, such as a keypad of a mobile phone, and transmits the interrupt signal to the microprocessor 10.

The microprocessor 10 responds to the predetermined interrupt signal, and transmits all working contexts stored in all registers of the first peripheral device 30, the second peripheral device 40, and the microprocessor 10 to the memory 60 through the on-chip bus 50.

When all the content of registers of at least one operating hardware module of the hardware modules 10, 30, and 40, which are included in the SOC 110, are stored in the memory 60 in a predetermined order of storage, the working context transmitting controller 70 responds to a predetermined storage command output from the microprocessor 10, or the other hardware module 30 or 40 to transmit the working context with respect to the at least one operating hardware module 10, 30, or 40, which is stored in the memory 60, to the non-volatile memory 130 through a predetermined interface.

Furthermore, the function of transmitting the working context to the non-volatile memory 130 can be performed by the microprocessor 10. Thus, the non-volatile memory 130 stores the working context with respect to the at least one operating hardware module 10, 30, or 40.

When all the working context is copied to and stored in the non-volatile memory 130, the working context transmitting controller 70 outputs a predetermined command signal to the power controller 80 or the microprocessor 10.

The power controller 80 responds to the predetermined command signal output from the working context transmitting controller 70 or the microprocessor 10 to output a power control signal PEN to the power supply 150. The power supply 150 responds to the power control signal PEN to cut off power supplied to the at least one operating hardware module 10, 30, or 40, except the power controller 80 and/or the working context transmitting controller 70. Thus, the SOC 110 enters a power-off standby mode.

Figure 2:
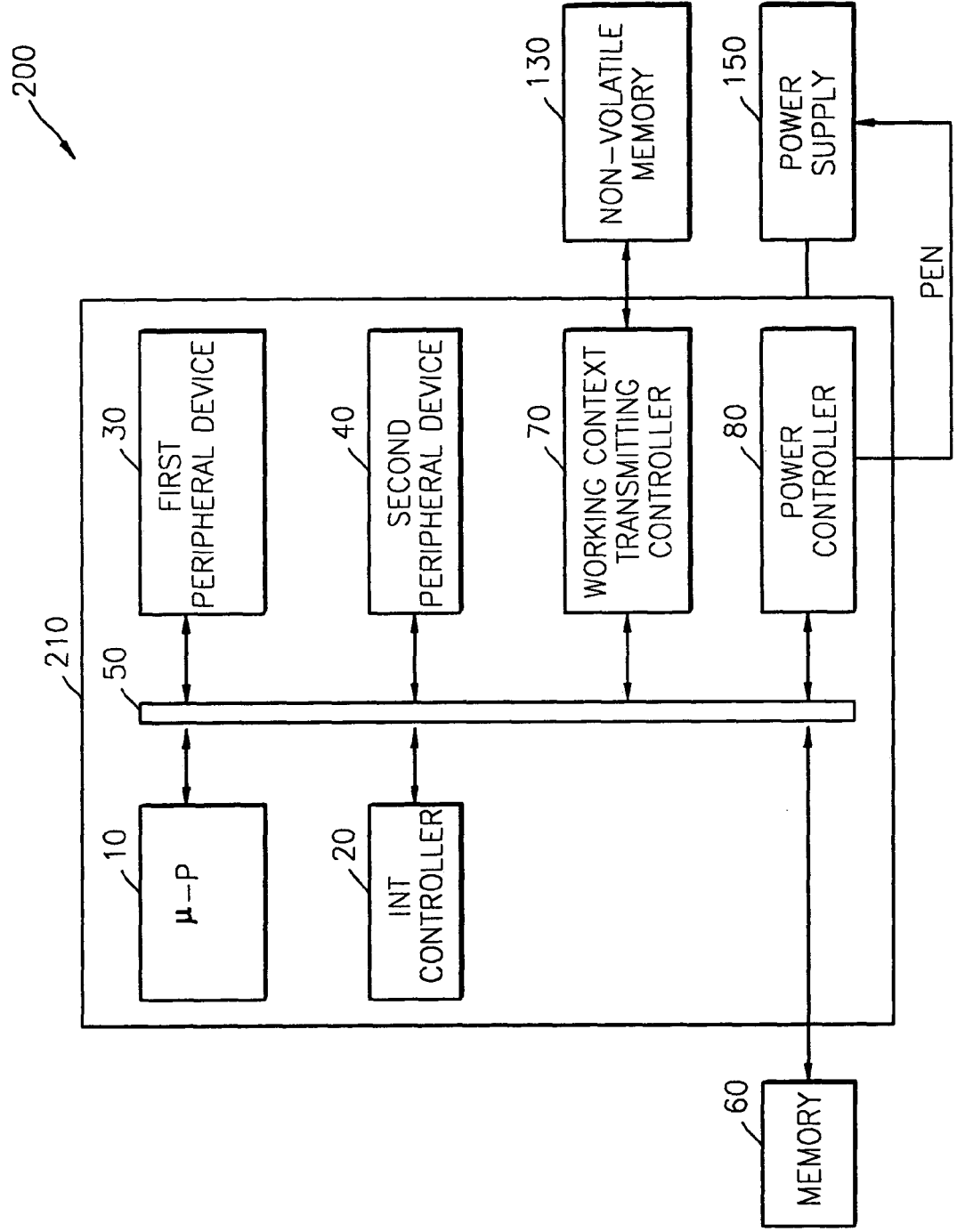
FIG. 2 is a block diagram of a system including a SOC, according to a second preferred embodiment of the present invention.

FIG. 2 is a block diagram of a system including a SOC according to a second preferred embodiment of the present invention. Referring to FIG. 2, with the exception of the memory 60 outside the SOC 210, operation and configuration of the system shown in FIG. 2 are the same as those described with respect to the system shown in FIG. 1.

A system 200 includes the memory 60 and a non-volatile memory 130 placed outside the SOC (or an integrated circuit) 210 having at least one hardware module 10, 30, or 40. The memory 60 stores working context with respect to the at least one hardware module 10, 30, or 40.

A working context transmitting controller 70 transmits the working context with respect to the at least one hardware module 10, 30, or 40, the working context being stored in the memory 60, to the non-volatile memory 130 during a power-off standby mode, and transmits the working context with respect to the at least one hardware module 10, 30, or 40, the working context being stored in the non-volatile memory 130, to the memory 60 when the power-off standby mode is released.

When the power-off standby mode is released, the at least one hardware module 10, 30, or 40 is recovered to a state immediately before the power-off standby mode by using the working context transmitted from the non-volatile memory 130 to the memory 60.

Figure 3:
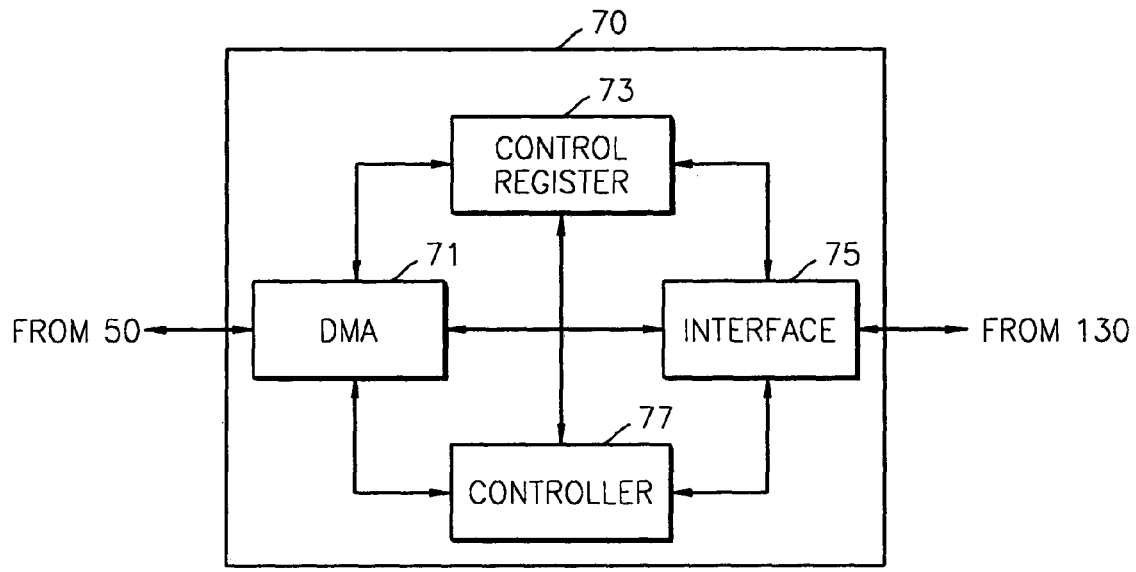
FIG. 3 is a block diagram of the working context transmitting controller shown in FIGS. 1 and 2.

FIG. 3 is a block diagram of the working context transmitting controller 70 shown in FIGS. 1 and 2. Referring to FIG. 3, the working context transmitting controller 70 includes a direct memory access ("DMA") unit 71, a control register 73, an interface 75, and a controller 77.

The DMA 71 inputs and/or outputs the working context between the memory 60 and the non-volatile memory 130 at a high speed. The control register 73 includes a plurality of registers, which have general operating information on the working context transmitting controller 70. The plurality of registers have information on areas of working context stored or to be stored in the memory 60, information on storage spaces of working context stored or to be stored in the non-volatile memory 130, and information on characteristics of the used non-volatile memory 130, such as a NAND flash memory, for example.

Figure 4:
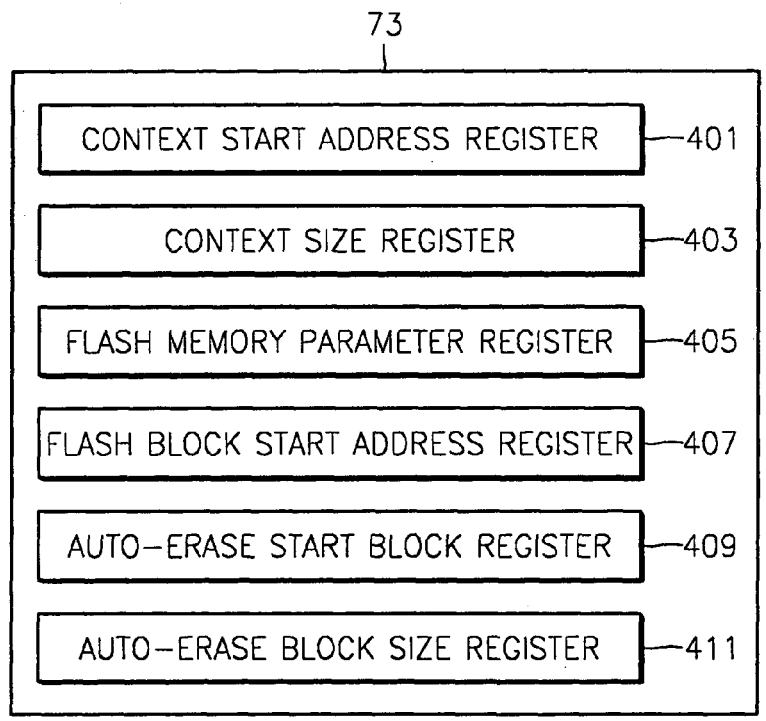
FIG. 4 is a block diagram illustrating the configuration of a control register shown in FIG. 3.

FIG. 4 is a block diagram illustrating the configuration of the control register shown in FIG. 3. Referring to FIG. 4, the working context transmitting controller 70 operates based on values respectively set in the registers of the control register 73. In the case that the non-volatile memory 130 is a NAND flash memory, the control register 73 will be explained as follows.

A context start address register 401 is a register for start addresses of data, namely, working context, which is to be transmitted from the memory 60 to the non-volatile memory 130 and stored in the non-volatile memory 130.

A context size register 403 is a register for the value of the size of the data, which is to be transmitted from the memory 60 to the non-volatile memory 130 and stored in the non-volatile memory 130. The size of the data to be stored in the non-volatile memory 130 may be represented in flash blocks, flash pages, or bytes, for example.

A flash memory parameter register 405 is a register for designating a type of the NAND flash memory connected to the SOC 110 or 210. Parameters include page size, the number of pages per block, and the number of address cycles.

A flash block start address register 407 is a register for assigning a start address of a flash block at a position in which working context is stored.

An auto-erase start block register 409 and an auto-erase block size register 411 are registers for automatically erasing working context storage areas of the NAND flash memory 130.

That is to say, the auto-erase start block register 409 is a register for the start address of a block to be erased, and the auto-erase block size register 411 is a register for the size of the block to be erased. After the start address and the block size of the block to be erased are set in the registers 409 and 411, the working context transmitting controller 70 erases an area in which working context is to be stored in order to store the next working context in a section where a bus connected between the SOC 110 or 210 and the non-volatile memory 130 is in an idle state, by a predetermined command signal output from the microprocessor 10.

The content stored in the control register 73 is saved even after the power supply 150 is cut off. Next, when the power is supplied again, a working context restoration is automatically performed.

Therefore, when the control register 73 is within the power controller 80 of FIGS. 1 and 2, power should always be supplied to the power controller 80. Further, when the control register 73 is within the working context transmitting controller 70, power should always be supplied to the power controller 80 and the working context transmitting controller 70.

The interface 75 between the DMA 71 and the non-volatile memory 130 performs interface, interface timing generation and data error correction functions.

The controller 77 controls the overall operation of the working context transmitting controller 70, and transmits the working context stored in the memory 60 to the non-volatile memory 130 and transmits the working context stored in the non-volatile memory 130 to the memory 60.

Figure 5:
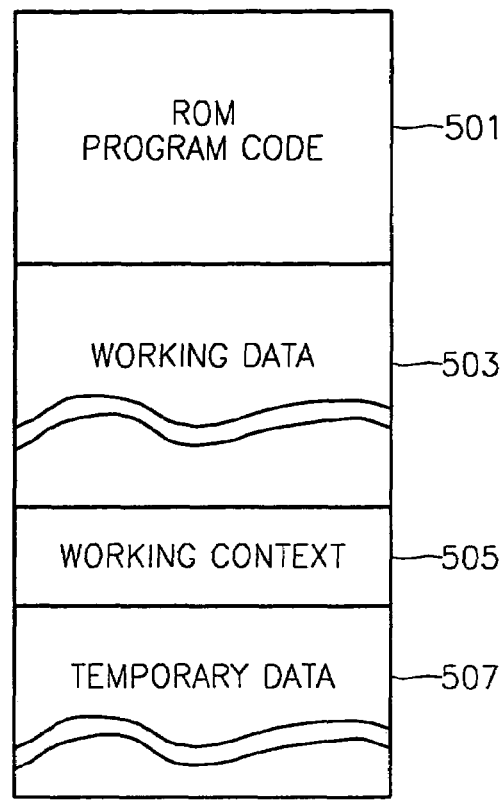
FIG. 5 is a first memory map illustrating areas of working context to be stored and restored when a non-volatile code memory is used.

FIG. 5 is a first memory map illustrating areas of working context to be stored and restored when a non-volatile code memory is used. FIG. 5 illustrates storage areas or storage spaces of the memory 60 according to a preferred embodiment of the present invention, when a program code is stored in a random access memory, such as ROM, which is an immediately operable non-volatile memory.

Referring to FIGS. 1 and 5, a working data area 503 is an area for storing data, which are generally used during programming, and a working context area 503 is an area for storing working context collected from the microprocessor 10 and the hardware modules 30 and 40 within the SOC 110 or 210 to enter the power-off standby mode.

When all the working context with respect to the hardware modules 10, 30, and 40 is stored in the memory 60 by the microprocessor 10, the working context transmitting controller 70 copies and transmits the content stored in the working data area 503 and the working context area 505 to the non-volatile memory 130 before entering the power-off standby mode.

Furthermore, when the power-off standby mode is released, the working context transmitting controller 70 transmits the content stored in the working data area 503 and the working context area 505 stored in the non-volatile memory 130 to the memory 60 through a predetermined bus. In this case, the working context with respect to the hardware modules 10, 30, and 40 is restored in the memory 60 to the state immediately before the power-off standby mode was executed.

A temporary data area 507 is an area for storing temporary data with respect to a program, which is not included in the working context.

The size of the working data area 503 and/or the working context area 505 can be managed by a predetermined operating system. A ROM program code area 501 may include a program code to determine whether the SOC has recovered from a power-off standby mode, undergoes an initial system boot-up, or undergoes an intentional rebooting.

The working context transmitting controller 70 identifies a program code included in the working context. When it is determined that the SOC 110 or 210 has recovered from a power-off standby mode, the working context transmitting controller 70 omits an operation of booting the SOC 110 or 210 and can directly enter a normal mode.

Figure 6:
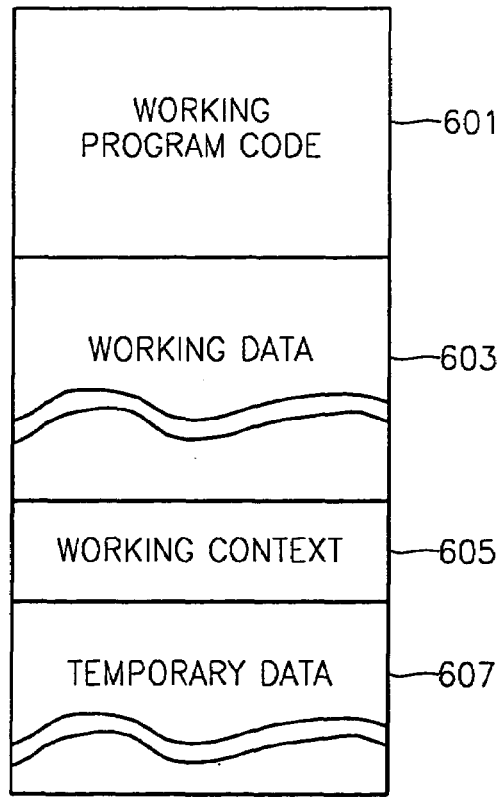
FIG. 6 is a second memory map illustrating areas of working context to be stored and restored when a non-volatile code memory is used.

FIG. 6 is a second exemplary memory map illustrating areas of working context to be stored and restored when the non-volatile code memory is used. Referring to FIG. 6, when a working program code is loaded from a secondary storage to the memory 60, the working context includes an area 601 for storing the working program code loaded to the memory 60, an area 603 for storing working data, and an area 605 for storing working context.

Referring to FIGS. 1 and 6, areas transmitted from the memory 60 to the non-volatile memory 130 or transmitted from the non-volatile memory 130 to the memory 60 include the area 601 for storing the working program code, the area 603 for storing the working data, and the area 605 for storing the working context.

Structures of the areas 603, 605, and 607 of FIG. 6 are substantially identical or similar to those of the areas 503, 505, and 507 of FIG. 5. A data structure of the working context area 505 or 605 may be modified to various forms according to the configuration of the SOC 110 or 210.

An operation of recovering the working context with respect to the hardware modules of the SOC 10 or 210, which is stored in the non-volatile memory 130, will be explained as follows.

Initially, when a user releases a power-off standby mode, e.g., when an interrupt signal is generated from the outside, or when a predetermined standby time set by the user has passed, the power supply 150 responds to a power control signal PEN output form the power controller 80 to supply power again to the hardware modules 10, 30 and 40 within the SOC 110, to which power supply is cut off during the power-off standby mode.

A predetermined reset signal generation circuit (not shown) on the SOC 110 outputs a reset release signal for releasing reset of the hardware modules 30, 40, and 70 to the hardware modules 30, 40, and 70 except the microprocessor 10.

Therefore, the working context transmitting controller 70 transmits or restores the working context with respect to the hardware modules 10, 30, and 40, which is stored in the non-volatile memory 130, to the memory 60 in response to the reset release signal. In this case, the microprocessor 10 still remains in a reset state.

When the working context transmitting controller 70 restores all the working context in the memory, the reset signal generation circuit (not shown) responds to a predetermined instruction signal output from the working context transmitting controller 70, to output to the microprocessor 10 a reset release signal for releasing reset of the microprocessor 10.

The microprocessor 10 fetches a program code from a predetermined address, for example, address 0 or the highest address in response to the reset release signal, and performs the fetched program code.

In this case, a first executed program code may be a program for determining whether the SOC has recovered from a power-off standby mode, undergoes an initial system boot-up, or undergoes an intentional rebooting.

If it is determined that the SOC has recovered from a power-off standby mode, the microprocessor 10 restores the working context with respect to the hardware modules 30 and 40 from the memory 60 in response to the reset release signal, and recovers its own working context.

Accordingly, the microprocessor 10 and the hardware modules 30 and 40 are recovered to a state immediately before the power-off standby mode was executed. Thus, the SOC 110 or 210 or the system 100 or 200 can operate in the state immediately before the power-off standby mode was executed.

Figure 7:
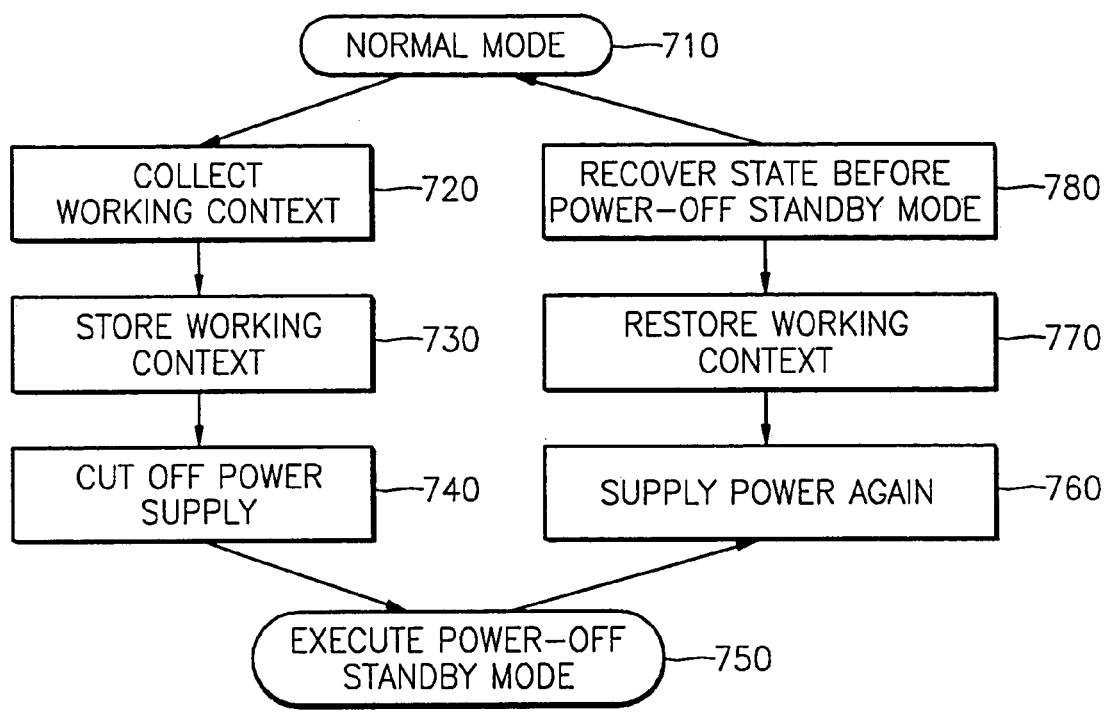
FIG. 7 is a flow chart illustrating a method of storing and recovering working context, according to a preferred embodiment of the present invention.

FIG. 7 is a flow chart illustrating a method of storing and recovering working context according to a preferred embodiment of the present invention.

Referring to FIGS. 1 and 7, from a normal mode at step 710, a step 720 is reached when a power-off standby mode is selected, and the microprocessor 10 collects a working context with respect to at least one hardware module 30 or 40, which is currently operating.

In step 730, after the collected working context is temporarily stored in the memory 60, the collected working context is transmitted to the non-volatile memory 130 outside the SOC 110, by the working context transmitting controller 70, and accordingly, the non-volatile memory 130 stores the working context with respect to the at least one hardware module 10, 30, or 40, which is operating on the SOC 110.

In step 740, when all the working context is stored in the non-volatile memory 130, the power supply 150 for supplying power to the at least one hardware module 10, 30, or 40, which is operating on the SOC 110, is cut off in response to a power control signal PEN output from the power controller 80. That is, the power supplied to the hardware module 10, 30, or 40 is cut off, and in step 750, the SOC 110 executes a power-off standby mode.

Even during this case, power should always be supplied to the power controller 80. Further, when the working context transmitting controller 80 includes the control register 73 shown in FIG. 3, power should always be supplied to the working context transmitting controller 80.

In step 760 of FIG. 7, when the power-off standby mode is released, the power supply 150 responds to the power control signal PEN output from the power controller 80, such that power is supplied again to the hardware modules 10, 30, and 40.

In step 770, the working context transmitting controller 70 copies or transmits the working context with respect to the hardware modules 10, 30, and 40, which is stored in the non-volatile memory 130, to the memory 60, so that the working context with respect to the hardware modules 10, 30, and 40, which is stored in the non-volatile memory 130, is restored. In this case, the microprocessor 10 still remains in a reset state.

In step 780, after the working context with respect to the hardware modules 10, 30, and 40 is restored to the memory 60, the microprocessor 10 recovers a state of the hardware modules 30 and 40 to a state immediately before the power-off standby mode was executed by using the working context with respect to the hardware modules 30 and 40, which is restored to the memory 60. Since the microprocessor 10 has restored using its own working context restored to the memory 60, the SOC 110 performs a predetermined operation in the state immediately before the power-off standby mode was executed.

As described above, the method of transmitting working context and the integrated circuit and system including the working context transmitting controller according to the present invention can rapidly transmit the working context with respect to hardware modules, which are operating prior to the power-off standby mode, to the non-volatile memory and cut off power supplied to the hardware modules, thereby reducing unnecessary current consumption. As a consequence, a standby time can be drastically lengthened without loss of volatile working context.

Further, when the power-off standby mode is released, the method of transmitting working context and the integrated circuit and system including the working context transmitting controller can rapidly recover the working context stored in the non-volatile memory, and accordingly, can recover the integrated circuit and system to the state immediately before the power-off standby mode was executed.

While the present invention has been particularly shown and described with reference to exemplary embodiments thereof, it will be understood by those of ordinary skill in the pertinent art that various changes in form and details may be made therein without departing from the spirit and scope of the present invention as defined by the following claims.

What is claimed is:

1. An integrated circuit comprising:
   at least one hardware module;
   a memory for storing working context with respect to the at least one hardware module;
   a microprocessor for transmitting the working context with respect to the at least one hardware module and its own working context to the memory in a power-off standby mode; and
   a working context transmitting controller for transmitting the working context with respect to the at least one hardware module, the working context being stored in the memory, to a non-volatile memory outside the integrated circuit, in response to a predetermined command signal,
   wherein the working context transmitting controller includes:
   a direct memory access unit for inputting and outputting the working context between the memory and the non-volatile memory;
   a control register including a plurality of registers, each of which has corresponding area information on the memory and/or the non-volatile memory;
   an interface between the direct memory access unit and the non-volatile memory; and
   a controller for transmitting the working context from the memory to the non-volatile memory through the interface during the power-off standby mode, and transmitting the working context stored in the non-volatile memory to the memory through the interface when the power-off standby mode is released.

2. The integrated circuit of claim 1, wherein the integrated circuit is a system-on-a-chip.

3. An integrated circuit comprising:
   at least one hardware module;
   a microprocessor for transmitting the working context with respect to the at least one hardware module and its own working context to the memory outside the integrated circuit, in a power-off standby mode; and
   a working context transmitting controller for transmitting the working context with respect to the at least one hardware module from the memory to a non-volatile memory outside the integrated circuit, in response to a predetermined command signal,
   wherein the working context transmitting controller includes:
   a direct memory access unit for inputting and outputting the working context between the memory and the non-volatile memory;
   a control register including a plurality of registers, each of which has corresponding area information on the memory and/or the non-volatile memory;
   an interface between the direct memory access unit and the non-volatile memory; and
   a controller for controlling the working context to be transmitted from the memory to the non-volatile memory through the interface during the power-off standby mode, and controlling the working context stored in the non-volatile memory to be transmitted to the memory through the interface when the power-off standby mode is released.

4. The integrated circuit of claim 3, wherein the integrated circuit is a system-on-a-chip.

5. An integrated circuit comprising:
   a plurality of hardware modules;
   a memory for storing working context with respect to the plurality of hardware modules; and
   a working context transmitting controller for transmitting the working context stored in the memory to a non-volatile memory outside the integrated circuit during a first operating mode, and transmitting the working context with respect to the hardware modules, which is stored in the non-volatile memory, to the memory during a second operating mode,
   wherein at least one of the hardware modules is recovered to a state existing immediately before the first operating mode was executed by using the working context, which is transmitted from the non-volatile memory to the memory during the second operating mode,
   wherein the working context transmitting controller includes:
   a direct memory access unit for inputting and outputting the working context between the memory and the non-volatile memory;
   a control register including a plurality of registers, each of which has corresponding area information on the memory and/or the non-volatile memory;
   an interface between the direct memory access unit and the non-volatile memory; and
   a controller for controlling the working context to be transmitted from the memory to the non-volatile memory through the interface during the first operating mode, and controlling the working context stored in the non-volatile memory to be transmitted to the memory through the interface during the second operating mode.

6. The integrated circuit of claim 5, wherein the integrated circuit is a system-on-a-chip.

7. An integrated circuit comprising:
   a plurality of hardware modules; and
   a working context transmitting controller for transmitting the working context with respect to the plurality of hardware modules form a memory outside the integrated circuit to a non-volatile memory outside the integrated circuit, during a first operating mode, and transmitting the working context with respect to the plurality of hardware modules stored in the non-volatile memory to the memory during a second operating mode,
   wherein the plurality of modules are recovered to a state existing immediately before the first operating mode was executed by using the working context transmitted from the non-volatile memory to the memory during the second operating mode,
   wherein the working context transmitting controller includes:
   a direct memory access unit for inputting and outputting the working context between the memory and the non-volatile memory;

a control register including a plurality of registers, each of which has corresponding area information on the memory and/or the non-volatile memory;
an interface between the direct memory access unit and the non-volatile memory; and
a controller for controlling the working context to be transmitted from the memory to the non-volatile memory through the interface during the first operating mode, and controlling the working context stored in the non-volatile memory to be transmitted to the memory through the interface during the second operating mode.

8. The integrated circuit of claim 7, wherein the integrated circuit is a system-on-a-chip.

9. A system comprising:
an integrated circuit having at least on hardware module; and
a non-volatile memory outside the integrated circuit,
wherein the integrated circuit includes:
a memory for storing working context with respect to the at least one hardware module; and
a working context transmitting controller for transmitting the working context stored in the memory to the non-volatile memory during a power-off standby mode, and transmitting the working context with respect to the at least one hardware module, which is stored in the non-volatile memory, to the memory when the power-off standby mode is released,
wherein when the power-off standby mode is released, the at least one hardware module is recovered to a state existing immediately before the power-off standby mode was executed by using the working context, which is transmitted to the memory,
wherein the working context transmitting controller includes:
a direct memory access unit for inputting and outputting the working context between the memory and the non-volatile memory;
a control register including a plurality of registers, each of which has corresponding area information on the memory and/or the non-volatile memory;
an interface between the direct memory access unit and the non-volatile memory; and
a controller for controlling the working context to be transmitted from the memory to the non-volatile memory through the interface during the power-off standby mode, and controlling the working context stored to be transmitted from the non-volatile memory to the memory through the interface when the power-off standby mode is released.

10. The integrated circuit of claim 9, wherein the integrated circuit comprises a system-on-a-chip.

11. A system comprising:
an integrated circuit including at least one hardware module;
a memory existing outside the integrated circuit for storing working context with respect to the hardware module; and
a non-volatile memory existing outside the integrated circuit,
wherein the integrated circuit includes a working context transmitting controller for transmitting the working context stored in the memory to the non-volatile memory during a power-off standby mode, and transmitting the working context with respect to the at least one hardware module, which is stored in the non-volatile memory, to the memory when the power-off standby mode is released,
wherein the at least one hardware module is recovered to a state existing immediately before the power-off standby mode was executed by using the working context transmitted from the non-volatile memory to the memory, when the power-off standby mode is released,
wherein the working context transmitting controller includes:
a direct memory access unit for inputting and outputting the working context between the memory and the non-volatile memory;
a control register including a plurality of registers, each of which has corresponding area information on the memory and/or the non-volatile memory;
an interface between the direct memory access unit and the non-volatile memory; and
a controller for controlling the working context to be transmitted from the memory to the non-volatile memory through the interface during the power off standby mode, and controlling the working context stored in the non-volatile memory to be transmitted to the memory through the interface when the power-off standby mode is released.

12. The system of claim 11, wherein the at least one hardware module is a microprocessor.

13. The integrated circuit of claim 11, wherein the integrated circuit comprises a system-on-a-chip.

* * * * *